US012306720B2

(12) United States Patent
Regen et al.

(10) Patent No.: US 12,306,720 B2
(45) Date of Patent: May 20, 2025

(54) SYSTEMS, METHODS, AND APPARATUSES FOR DETERMINING AND APPLYING A BACKUP FILE ATTRIBUTION TO FILES IN AN ELECTRONIC NETWORK

(71) Applicant: BANK OF AMERICA CORPORATION, Charlotte, NC (US)

(72) Inventors: Samuel Martin Regen, Fairfield, CA (US); Gary Eugene Troxell, Sandy Hook, VA (US); Heidi Renea Witthoeft, Charlotte, NC (US); Gaurav Jain, Singapore (SG); Troy Mansell, Jacksonville, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 115 days.

(21) Appl. No.: 18/112,700

(22) Filed: Feb. 22, 2023

(65) Prior Publication Data
US 2024/0281338 A1    Aug. 22, 2024

(51) Int. Cl.
*G06F 7/00* (2006.01)
*G06F 11/14* (2006.01)

(52) U.S. Cl.
CPC ...... *G06F 11/1451* (2013.01); *G06F 11/1464* (2013.01); *G06F 2201/84* (2013.01)

(58) Field of Classification Search
CPC ............ G06F 11/1451; G06F 11/1464; G06F 2201/84
USPC ....... 707/645, 647, 652, 654, 653, 674, 692, 707/999.001, 638, 640, 999.009, 999.202, 707/E17.01
See application file for complete search history.

(56) References Cited

U.S. PATENT DOCUMENTS

| | | |
|---|---|---|
| 5,276,860 A | 1/1994 | Fortier |
| 6,073,128 A | 6/2000 | Pongracz |
| 7,328,366 B2 | 2/2008 | Michelman |
| 7,483,929 B2 | 1/2009 | Kulkarni |
| 7,584,226 B2 | 9/2009 | Fatula, Jr. |
| 7,610,307 B2 | 10/2009 | Havewala |
| 7,650,341 B1 | 1/2010 | Oratovsky |

(Continued)

FOREIGN PATENT DOCUMENTS

| | | | | |
|---|---|---|---|---|
| CN | 110858123 B | * | 6/2021 | ............. G06F 3/064 |
| EP | 0629950 A1 | | 12/1994 | |

(Continued)

*Primary Examiner* — Md I Uddin
(74) *Attorney, Agent, or Firm* — Moore & Van Allen PLLC; Lauren M. Stokes

(57) ABSTRACT

Systems, computer program products, and methods are described herein for determining and applying a backup file attribution to files in an electronic network. The present invention is configured to receive data associated with at least one file, wherein the file is stored in at least one data store; and generate at least one file attribute for the file, wherein, in an instance where the file is a tape file type, generate a backup file attribute, wherein, in an instance where the file is not a tape file type, generate a non-backup file attribute, wherein, in an instance where the file is not a type file type and the file comprises a backup feature in the data, generate the backup file attribute, or wherein, in an instance where the file is a tape file type and the file comprises a non-backup feature in the data, generate the non-backup file attribute.

12 Claims, 6 Drawing Sheets

(56) References Cited

U.S. PATENT DOCUMENTS

| | | |
|---|---|---|
| 7,657,509 B2 | 2/2010 | Clark |
| 8,073,815 B1 | 12/2011 | Korshunov |
| 8,117,163 B2 | 2/2012 | Brown |
| 8,341,117 B2 | 12/2012 | Ram |
| 8,805,789 B2 | 8/2014 | Berman |
| 8,914,334 B2 | 12/2014 | Berman |
| 9,552,362 B2 | 1/2017 | Borden |
| 10,061,535 B2 | 8/2018 | Prahlad |
| 11,301,420 B2 | 4/2022 | Vijayan |
| 11,436,096 B2 | 9/2022 | Kumarasamy |
| 2010/0077161 A1* | 3/2010 | Stoakes ............... G06F 11/1453 711/E12.103 |
| 2020/0319976 A1* | 10/2020 | Shu ..................... G06F 11/1453 |
| 2020/0379672 A1* | 12/2020 | Sugihara ............... G06F 3/0685 |

FOREIGN PATENT DOCUMENTS

| | | |
|---|---|---|
| EP | 2102751 A2 | 9/2009 |
| EP | 2477114 A2 | 7/2012 |
| JP | 2019008373 A * | 1/2019 |

* cited by examiner

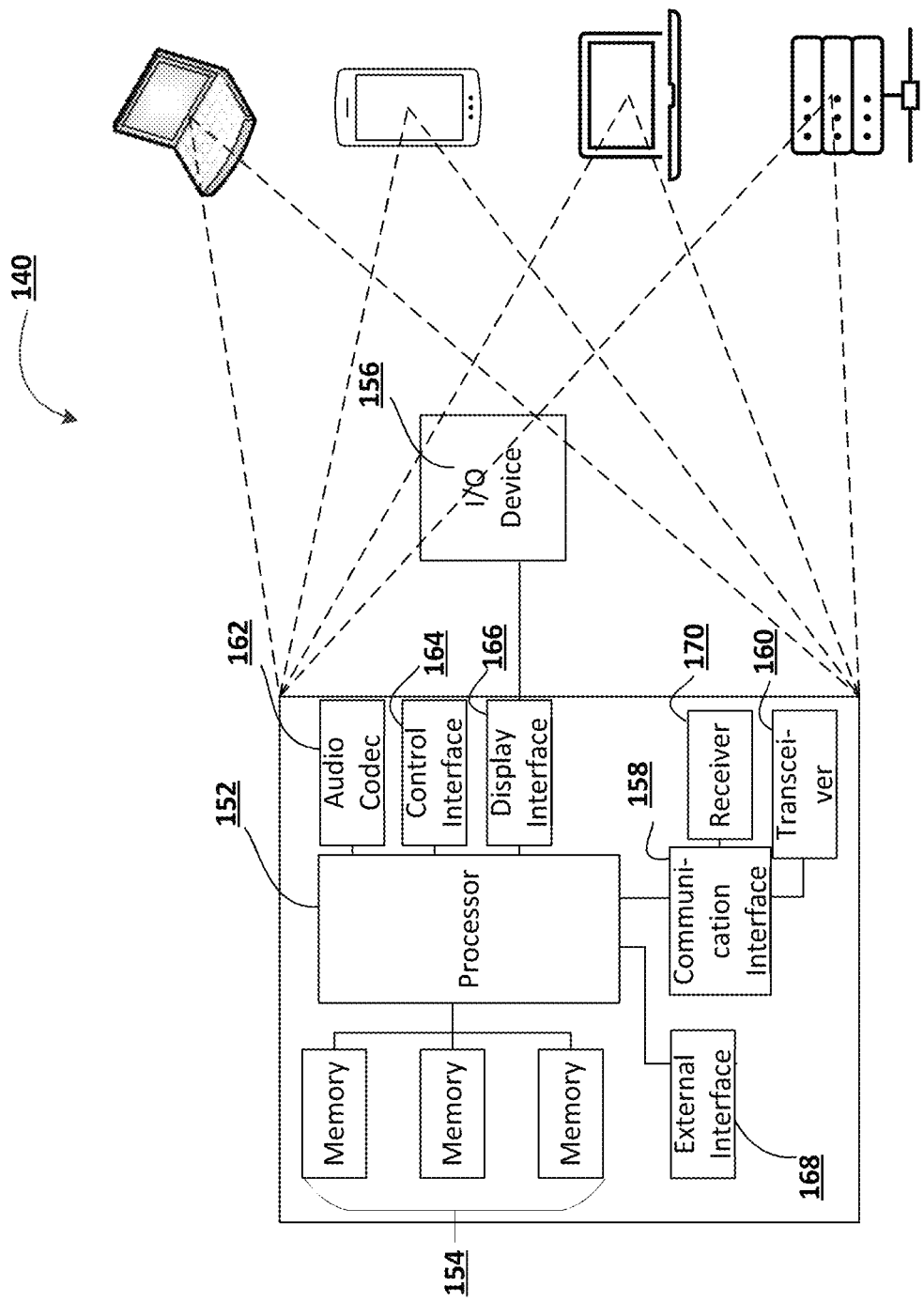

SYSTEMS, METHODS, AND APPARATUSES FOR DETERMINING AND APPLYING A BACKUP FILE ATTRIBUTION TO FILES IN AN ELECTRONIC NETWORK

FIELD OF THE INVENTION

The present invention embraces a system for determining and applying a backup file attribution to files in an electronic network.

BACKGROUND

Managers of electronic networks have a harder time than ever determining which files are backup files for the original file, especially when the original file is corrupted and/or under attack. Thus, there exists a need for an accurate, efficient, and compatible system that allows files associated with different systems and/or different file types to be identified as backups without requiring a conversion of the files to conform to certain backup determination tools, which would be time-consuming and infeasible for large networks comprising many files which are constantly updating.

Applicant has identified a number of deficiencies and problems associated with for determining and applying a backup file attribution to files in an electronic network. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for determining and applying a backup file attribution to files is provided. The system may comprise: a memory device with computer-readable program code stored thereon; at least one processing device operatively coupled to the at least one memory device and the at least one communication device, wherein executing the computer-readable code is configured to cause the at least one processing device to: receive data associated with at least one file, wherein the file is stored in at least one data store; and generate at least one file attribute for the at least one file, wherein, in an instance where the at least one file is a tape file type, generate a backup file attribute for the at least one file, wherein, in an instance where the at least one file is not a tape file type, generate a non-backup file attribute for the at least one file, wherein, in an instance where the at least one file is not a type file type and the at least one file comprises a backup feature in the data of the at least one file, generate a backup file attribute for the at least one file, or wherein, in an instance where the at least one file is a tape file type and the at least one file comprises a non-backup feature in the data of the at least one file, generate a non-backup file attribute for the at least one file.

In some embodiments, the non-backup feature comprises a non-backup identifier in an executable code associated with creating the at least one file.

In some embodiments, the processing device is further configured to store the backup file attribute in a metadata of the at least one file.

In some embodiments, the at least one file comprises one of a write-once file type, a write-once read many (WORM) file type, or a disk file type.

In some embodiments, the processing device is further configured to store the at least one file comprising the backup file attribute in a central record database. In some embodiments, the processing device is further configured to store the at least one file comprising the backup file in the central record database, wherein the central record database is stored in a computing system.

In some embodiments, the processing device is further configured to generate a backup file report comprising a file identifier for each file of the at least one file comprising the backup file attribute. In some embodiments, the processing device is further configured to store the backup file report in a central record database.

In some embodiments, the processing device is further configured to apply an immutability feature to the at least one file comprising the tape file type.

In another aspect, a computer program product for determining and applying a backup file attribution to files is provided. In some embodiments, the computer program product comprises at least one non-transitory computer-readable medium having computer-readable program code portions embodied therein, the computer-readable program code portions which when executed by a processing device are configured to cause a processor to: receive data associated with at least one file, wherein the file is stored in at least one data store; and generate at least one file attribute for the at least one file, wherein, in an instance where the at least one file is a tape file type, generate a backup file attribute for the at least one file, wherein, in an instance where the at least one file is not a tape file type, generate a non-backup file attribute for the at least one file, wherein, in an instance where the at least one file is not a type file type and the at least one file comprises a backup feature in the data of the at least one file, generate a backup file attribute for the at least one file, or wherein, in an instance where the at least one file is a tape file type and the at least one file comprises a non-backup feature in the data of the at least one file, generate a non-backup file attribute for the at least one file.

In some embodiments, the non-backup feature comprises a non-backup identifier in an executable code associated with creating the at least one file.

In some embodiments, the processing device is configured to cause the processor to store the at least one file comprising the backup file attribute in a central record database. In some embodiments, the processing device is configured to cause the processor to store the at least one file comprising the backup file in the central record database, and wherein the central record database is stored in a computing system.

In some embodiments, the processing device is further configured to cause the processor to generate a backup file report comprising a file identifier for each file of the at least one file comprising the backup file attribute.

In some embodiments, the processing device is configured to cause the processor to apply an immutability feature to the at least one file comprising the tape file type.

In another aspect, a computer-implemented method for determining and applying a backup file attribution to files is provided. In some embodiments, the computer-implemented method may comprise: receiving data associated with at least one file, wherein the file is stored in at least one data store; and generating at least one file attribute for the at least one file, wherein, in an instance where the at least one file is a tape file type, generating a backup file attribute for the at least one file, wherein, in an instance where the at least one file is not a tape file type, generating a non-backup file attribute for the at least one file, wherein, in an instance where the at least one file is not a type file type and the at least one file comprises a backup feature in the data of the at least one file, generating a backup file attribute for the at least one file, or wherein, in an instance where the at least one file is a tape file type and the at least one file comprises a non-backup feature in the data of the at least one file, generating a non-backup file attribute for the at least one file.

In some embodiments, the computer-implemented method further comprises determining at least one non-backup file attribute for the at least one file comprising the tape file attribute based on a non-backup feature in the data of the at least one file, wherein the non-backup feature comprises a non-backup identifier in an executable code associated with creating the at least one file.

In some embodiments, the computer-implemented method further comprises storing the at least one file comprising the backup file attribute in a central record database. In some embodiments, the computer-implemented method further comprises storing the at least one file comprising the backup file in the central record database, and wherein the central record database is stored in a computing system.

In some embodiments, the computer-implemented method further comprises generating a backup file report comprising a file identifier for each file of the at least one file comprising the tape file type.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 2:
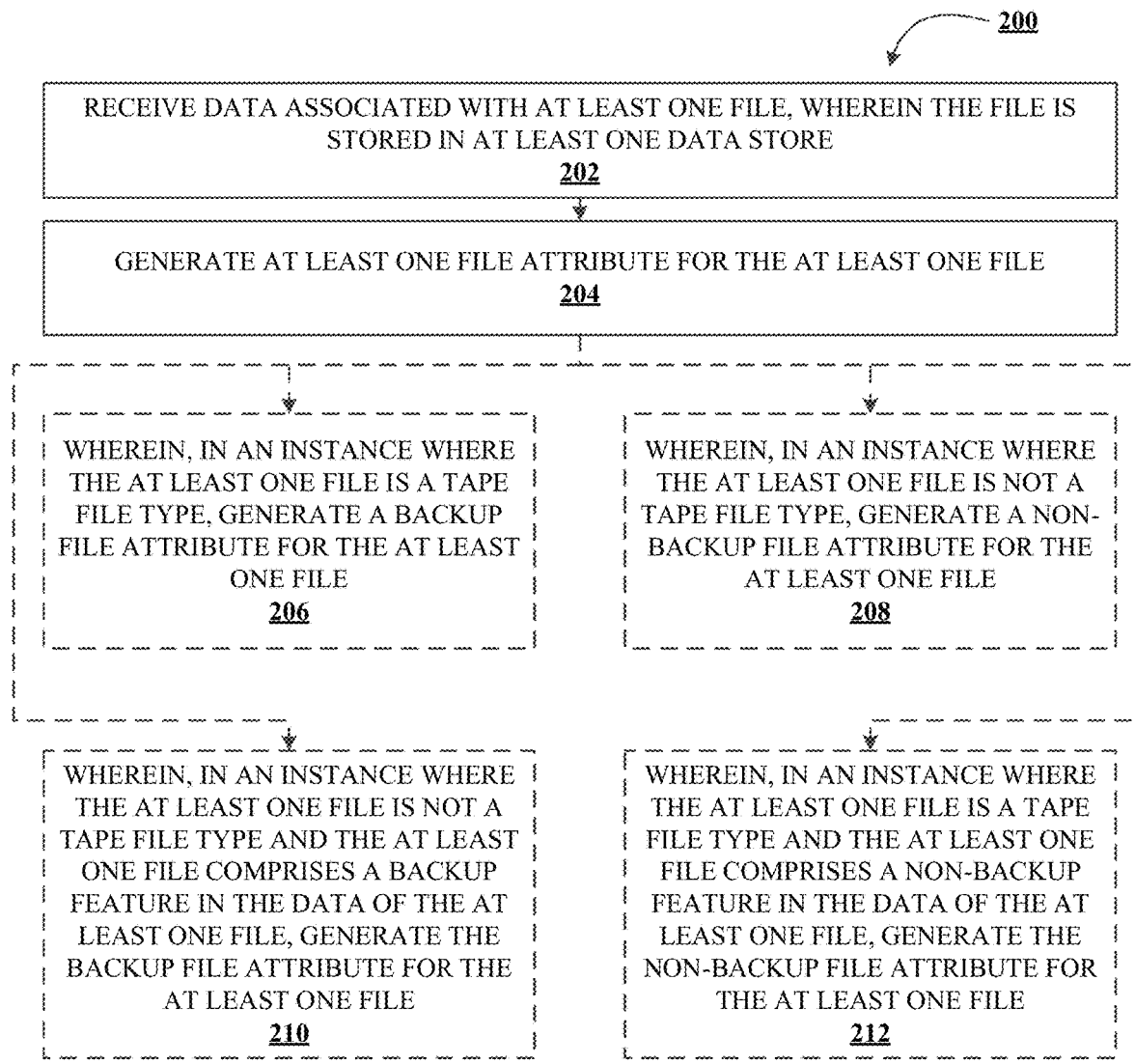
Figure 3:
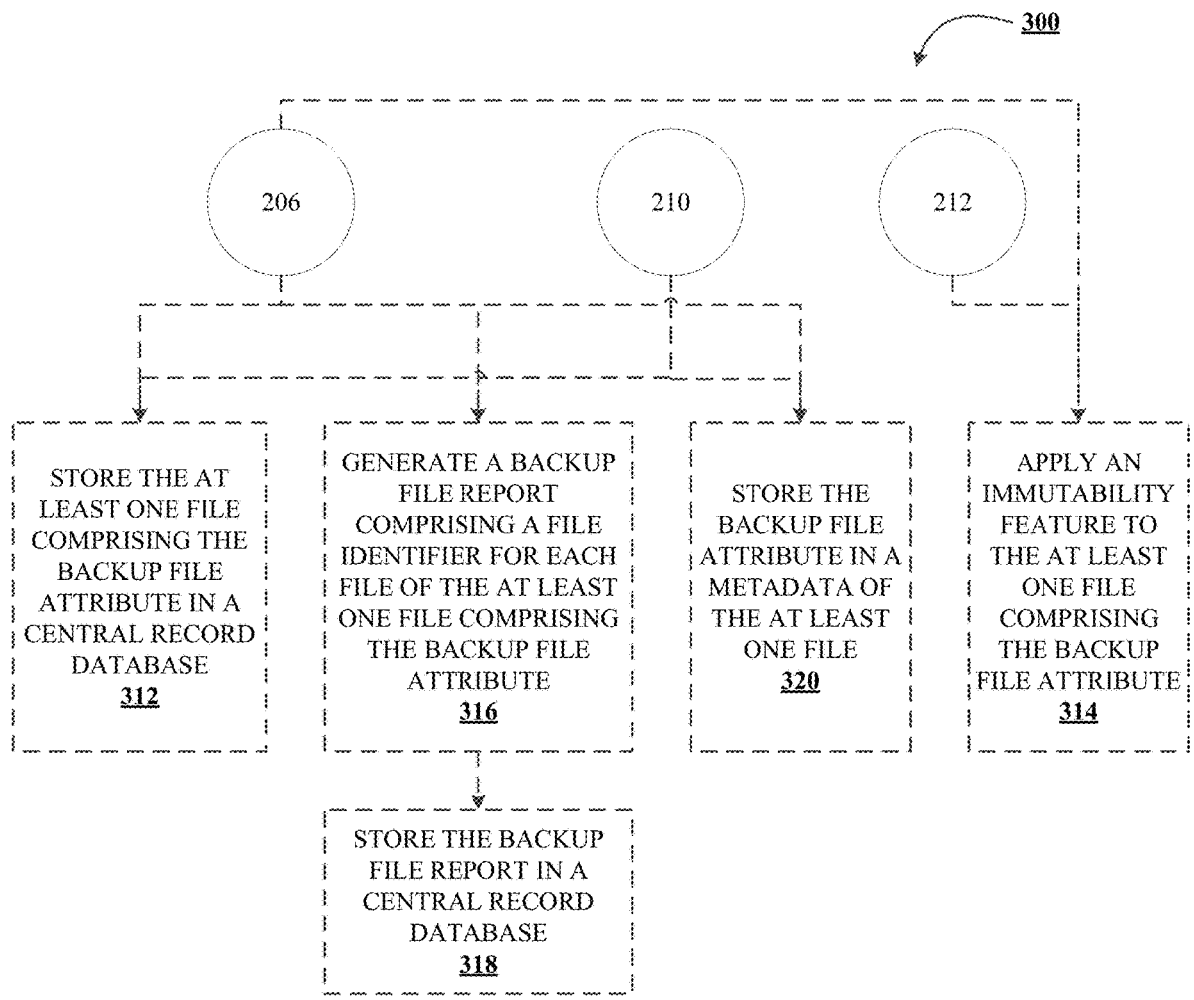

Having thus described embodiments of the invention in general terms, reference will now be made the accompanying drawings, wherein:

FIGS. 1A-1D illustrates technical components of an exemplary computing environment for determining and applying a backup file attribution to files in an electronic network, in accordance with an embodiment of the invention;

FIG. 2 illustrates a process flow for determining and applying a backup file attribution to files in an electronic network, in accordance with an embodiment of the invention; and FIG. 3 illustrates a process flow for storing the file associated with the backup file attribution, applying an immutability feature to the at least one file, and/or storing the backup file report, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described herein, the disclosure is directed to a backup file attribution system which accurately and efficiently determines which files are backup files within a network, without requiring a conversion of the files to be compatible with a particular tool. In this manner, the backup file attribution system is compatible with all file types and all networks, all while accurately and efficiently generating backup file attributions for each file determined to be a backup. Simply put, the backup file attribution system acts to determine and/or generate backup file attributions for each file. Thus, the backup file attribution system can be performed by selection or exception. For instance, the backup file attribution system may identify exceptions for at least one particular file type which may be used to determine and/or generate a backup file attribute, automatically, for those particular file types (e.g., an exception may indicate that a WORM file type may or may not be a backup file, a tape file type may or may not be a backup file, a disk file type may or may not be a backup file, and/or the like).

In some embodiments, the backup file attribution system may further generate an immutability feature for each of the files comprising the generated or determined backup file attribution, such that each of these files will remain immutable (e.g., will not be deleted, modified, overwritten, moved, removed, and/or the like). Further, and in some embodiments, the backup file attribution system may generate a report (e.g., a backup file report) comprising each of the file identifiers for each of the files determined to be a backup (e.g., comprising a backup file attribution), such that the file may be quickly recalled, such as when an attack on the original file is detected. Further, and in some embodiments, the backup file attribution system may store each of the files determined to be a backup file in a single database, such as a central record database like that described herein.

Managers of electronic networks have a harder time than ever determining which files are backup files for the original file, especially when the original file is corrupted and/or under attack. Thus, there exists a need for an accurate, efficient, and compatible system that allows files associated with different systems and/or different file types to be identified as backups without requiring a conversion of the files to conform to certain backup determination tools, which would be time-consuming and infeasible for large networks comprising many files which are constantly updating.

Such a system (i.e., a backup file attribution system) like that described herein may solve the above-identified problems in the field of technology, such as those problems related to accurately and efficiently identifying backup files in a network without the requirement of file conversion for all the files within the network. Further, such a conversion of each of the files may run the potential problem of corrupting the file, unintentionally modifying the data of the file, unintentionally deleting the file, and/or the like, which could cause the copy/backup of the original file to be lost forever.

Thus, the backup file attribution system acts first by assuming each write-once file (such as a write-once, ready many, WORM, file) is automatically a backup file and thus generates a backup file attribution for each write-once file. Further, and in some embodiments, the backup file attribution system then looks at each non-write-once file (e.g., which may comprise a tape file, a disk file, and/or the like)—which only likely comprises a smaller portion of the files in the network than the write-once files—to determine which non-write-once file(s) comprise at least one backup feature, which in turn may be used by the backup file attribution system to determine or generate the backup file attribution for the files comprising the at least one backup feature. In this manner, the backup file attribution system may only be required to look at a small subset (e.g., likely a smaller subset of the files in a network as compared to the subset of files which are write-once) of files to determine a backup feature. Thus, and in some embodiments like that described herein, the backup file attribution system acts to identify backup files based on a management by exception. However, and in some embodiments, the backup file attribution system may be performed through a selection of the files which should be backup files and/or a selection of the files which should not be backup files.

Thus, and in some embodiments, such a central record database comprising all the files and associated data for each of the backup files within the network allows the backup file attribution system to improve over prior systems in accurately tracking and storing backup files and associated, efficiently tracking and storing backup files and associated data, and allowing a uniform tracking and storage system of backup files without requiring a uniform compatibility/uniform conversion for each of the files in order to make such a backup file determination.

Accordingly, the backup file attribution system acts by receiving data associated with at least one file, where the file is stored in at least one data store (e.g., such as a data store associated with a network). Further, the backup file attribution system may act to generate at least one file attribute for the at least one file, wherein—in an instance where the at least one file is a tape file type (e.g., a tape file)—the backup file attribution system may generate a backup file attribute for the at least one file; or wherein—in an instance where the at least one file is not a tape file type (e.g., not a tape file), the backup file attribution system may generate a non-tape file attribute for the at least one file. Lastly, and in some embodiments, the backup file attribution system may additionally determine at least one backup file attribute for the at least one file comprising the non-tape file attribute based on a backup feature in the data of the at least one file.

What is more, the present invention provides a technical solution to a technical problem. As described herein, the technical problem includes the accurate and efficient determination of backup files within a network, where such a network may comprise a large number of files which may further be constantly updating and changing and whereby each file may comprise different file types, metadata types, and executable code. The technical solution presented herein allows for a backup file attribution system which accurately and efficiently determines each backup file within a network, without requiring a conversion each of the files to a particular file type, metadata type, executable code type, and/or the like. In particular, the backup file attribution system is an improvement over existing solutions to the backup file determination and tracking, (i) with fewer steps to achieve the solution, thus reducing the amount of computing resources, such as processing resources, storage resources, network resources, and/or the like, that are being used (e.g., by automatically generating a backup file attribute for each write-once file type before analyzing each non-write-once file type for a backup feature(s)), (ii) providing a more accurate solution to problem, thus reducing the number of resources required to remedy any errors made due to a less accurate solution (e.g., by not requiring conversion to a uniform file type, uniform metadata type, uniform executable code type, and/or the like, the backup file attribution system prevents the potential corruption, deletion, modification, and/or the like of backup files), (iii) removing manual input and waste from the implementation of the solution, thus improving speed and efficiency of the process and conserving computing resources (e.g., by not requiring manual review of each file to determine backup feature(s)), (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1A:
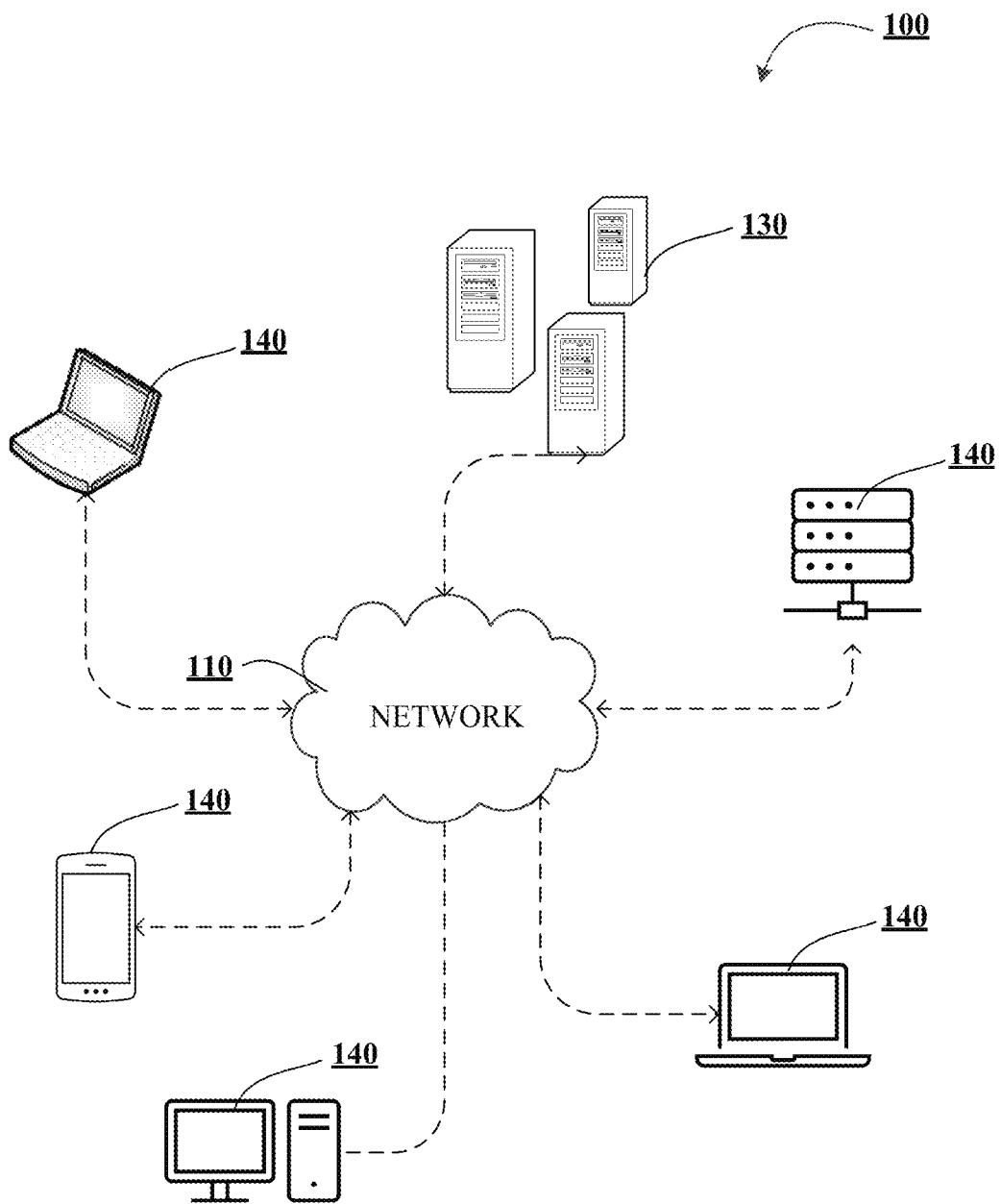

FIGS. 1A-1D illustrate technical components of an exemplary computing environment (e.g., a distributed computing system and/or a mainframe computing system) for determining and applying a backup file attribution to files in an electronic network 100, in accordance with an embodiment of the invention. As shown in FIG. 1A, the distributed computing environment 100 contemplated herein may include a system 130 (i.e., a backup file attribution), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

Figure 1B:
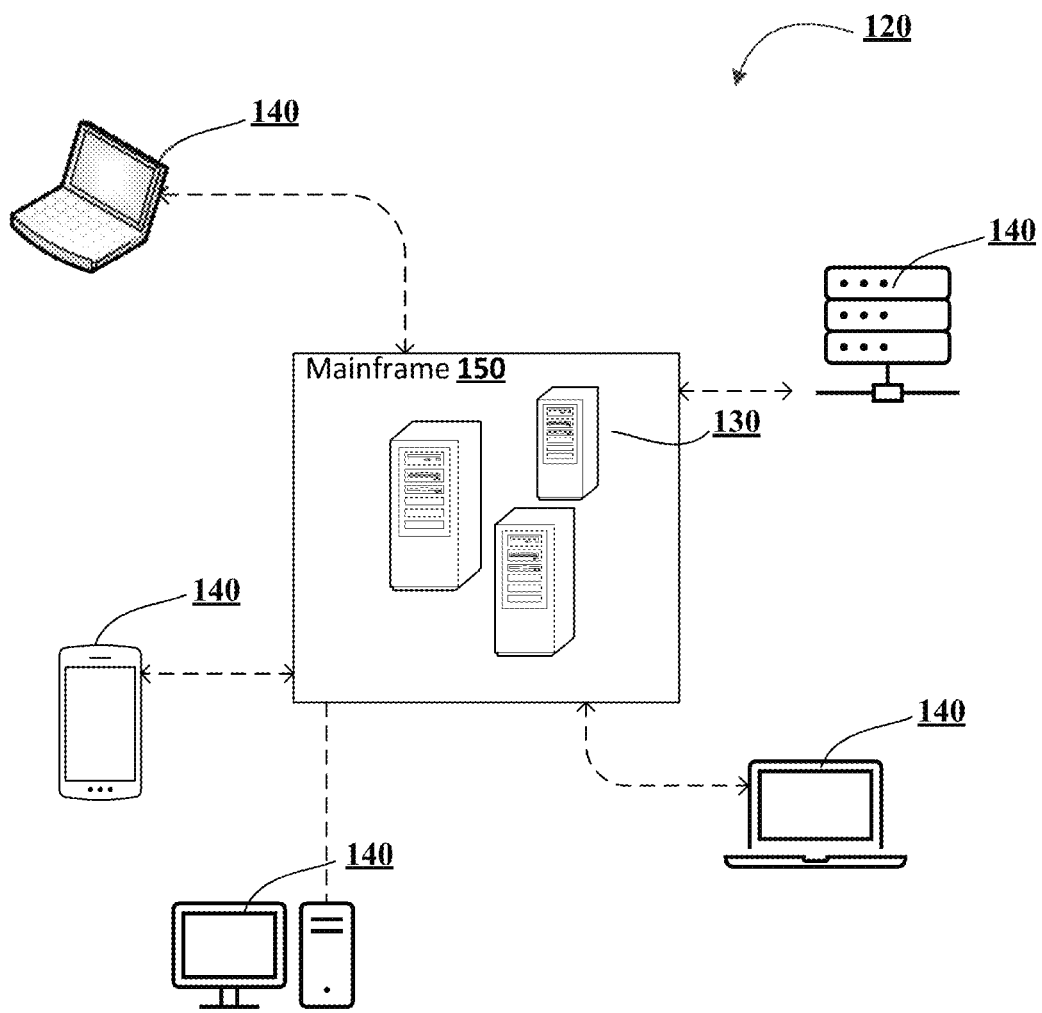

FIG. 1B illustrate technical components of an exemplary mainframe computing environment (i.e., a mainframe computing system) for determining and applying a backup file attribution to files in an electronic network 120, in accordance with an embodiment of the invention. As shown in FIG. 1B, the mainframe computing environment 120 a mainframe system 150 (e.g., a mainframe computer), a system 130 (i.e., a backup file attribution), and end-point device(s) 140. In some embodiments, the mainframe computer may comprise the system 130 and/or be connected to the system 130 via a network, such as network 110 shown in FIG. 1A. For instance, and in some embodiments, the mainframe system 150, the system 130, and/or the end-point devices 140 may each be connected to a network, such as network 110 of FIG. 1A. FIG. 1B illustrates only one example of an embodiment of the mainframe computing environment 120, and it will be appreciated that in other embodiments one or more of the systems, devices, and/or services may be combined into a single system, device, or server, or be made up of multiple systems, devices, or servers. Additionally, the mainframe computing environment 120 may include multiple systems, same or similar to system 130, with each system providing portions of the necessary operations (e.g., as a server bank, a group of blade servers, or a multi-processor system).

It is to be understood that the structure of the mainframe computing environment and its components, connections and relationships, and their functions, are meant to be exemplary only, and are not meant to limit implementations of the inventions described and/or claimed in this document. In one example, the mainframe computing environment 120 may include more, fewer, or different components. In another example, some or all of the portions of the mainframe computing environment 120 may be combined into a single portion or all of the portions of the system 130 may be separated into two or more distinct portions.

Figure 1C:
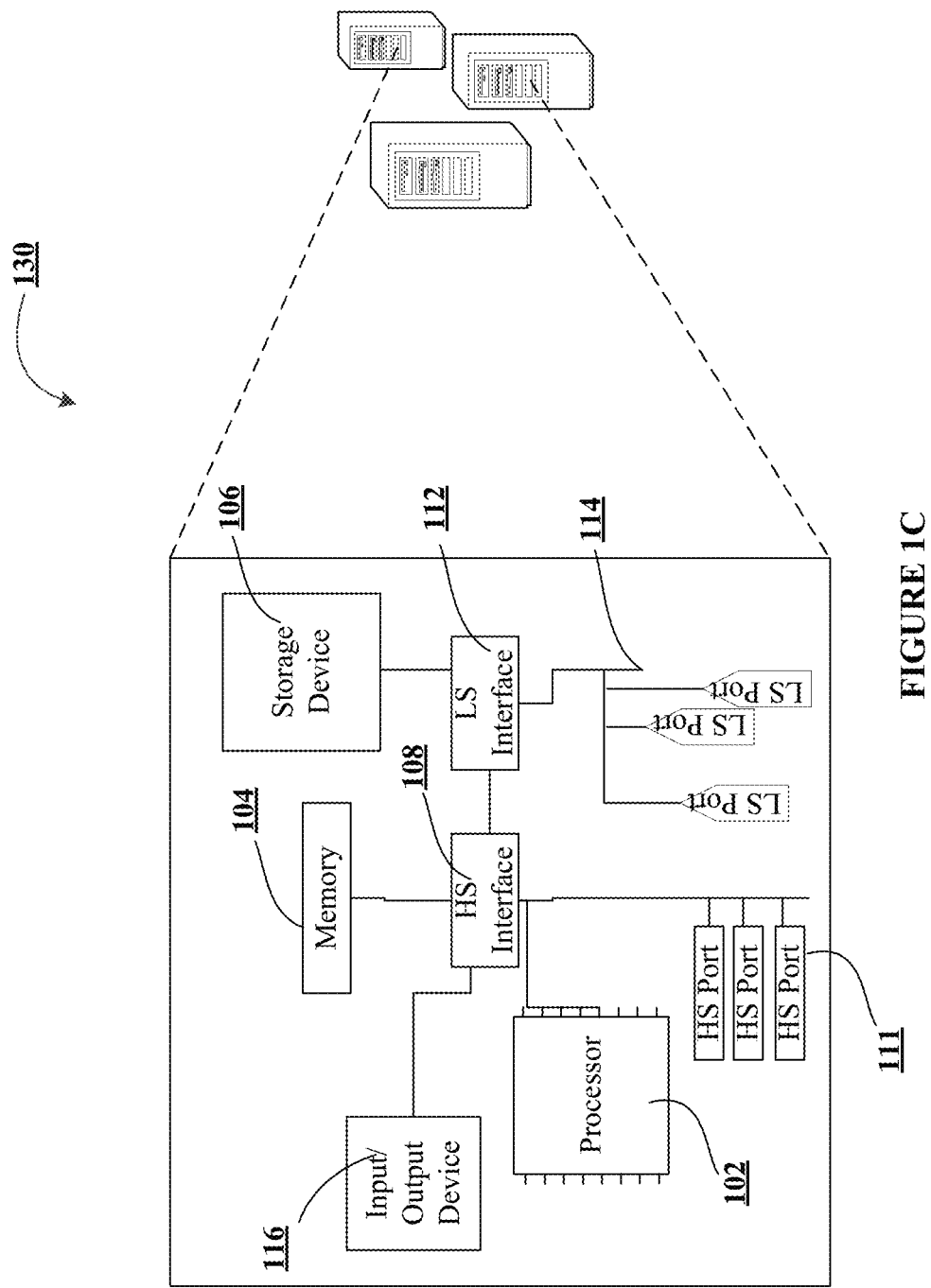

FIG. 1C illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1D illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for determining and applying a backup file attribution to files in an electronic network, in accordance with an embodiment of the invention. In some embodiments, a system (e.g., similar to one or more of the systems described herein with respect to FIGS. 1A-1D) may perform one or more of the steps of process flow 200. For example, a backup file attribution system (e.g., the system 130 described herein with respect to FIG. 1A-1D) may perform the steps of process 200.

As shown in block 202, the process flow 200 may include the step of receiving data associated with at least one file, wherein the file is stored in at least one data store. In some embodiments, the backup file attribution system may receive data from a data store, a database, a storage device, a network device, and/or the like where, where such data is associated with at least one file that is stored and/or has passed through the data store, database, storage device, network device, and/or the like. For instance, and where a file within a system (e.g., a closed network system, an open network system, and/or the like) is stored in a particular database, storage device, data store, and/or the like, the particular database, storage device, data store, and/or the like may transmit either the file itself and its associated data, a copy of the file and its associated data, and/or the like to the backup file attribution system for determination of whether the file is a backup file.

In some embodiments, the file may comprise a write-once ready many (WORM) file type, a tape file type, a disk file type, a write once read once file type, a PDF file type, a word document file type (DOC and/or DOCX file type), Excel spreadsheet file type (XLS file type), text file type (TXT file type), and/or the like. For instance, and in some embodiments, the backup file attribution system may determine the file type of the file once the data associated with the file is received and the backup file attribution system parses the data. In some embodiments, the backup file attribution system may determine the file type by parsing the file identifier (e.g., a file name which may comprise a .filetype at the end of the file identifier, such as a .DOCX, .DOC, .PDF, .XLS, and/or the like), whereby the backup file attribution system may parse the file identifier to determine the file type.

As shown in block 204, the process flow 200 may include the step of generating at least one file attribute for the at least one file. In some embodiments, the backup file attribution system may generate at least one file attribute for the at least one file, whereby the file attribute may comprise an attribute indicating the file is a backup file (e.g., a backup file attribute, a non-backup file attribute, and/or the like), the file is not a backup file (e.g., the file comprises a non-backup file attribute), a primary file attribute (e.g., indicating the file is not a backup and is the primary file from which a backup may be copied from), and/or the like.

In some embodiments, and as shown in block 206, the process flow 200 may include the step of generating, in an instance where the at least one file is a tape file type, a backup file attribute for the at least one file. In some embodiments, the backup file attribution system may generate—based on determining the at least one file is a tape file type—a backup file attribute for the at least one file. For instance, the backup file attribution system may automatically determine that each file that comprises a tape file type is automatically a backup file.

In some embodiments, the backup file attribution system may configure this logic to other types of files, such as a logic to generate a backup file attribute for a write-once file type, a write-once ready many (WORM) file type, a disk file type, a PDF file type, a DOC file type, and/or the like. In this manner, the backup file attribution system may automatically consider each of the files comprising a pre-determined file type (such as a tape file type like the instance described herein) as being a backup file, whereby the backup file attribution system may then generate the backup file attribute for each of the files comprising tape file types. Such a backup file attribution system as that described herein improves over prior systems by automatically generating backup file attributes for all files comprising tape file type, which may (in many systems) comprise most of the files within both a closed network system and/or an open network system.

As described herein, the backup file attribution system acts to determine and/or generate backup file attributions for each file through management of exceptions or selections. For instance and with respect to a management by exception, the backup file attribution system may identify exceptions for at least one particular file type which may be used to determine and/or generate a backup file attribute, automatically, for those particular file types (e.g., an exception may indicate that a particular tape file type may or may not be a backup file based on a particular non-backup feature identified by the backup attribution system, a WORM tape file type may or may not be a backup file, a disk file type may or may not be a backup file, and/or the like). Thus, the backup file attribution system may allow a user of the backup file attribution system, a manager of the backup file attribution system, the backup file attribution system itself, and/or the like, to decide which file types to automatically generate a backup file attribute for (e.g., such as a write-once file type, a tape file type, a disk file type, and/or the like) and which files, based on their features (e.g., features identified based on the file's creation data) should or should not be automatically considered a backup file. Such a use of these features are described in further detail below with respect to blocks 210 and 212.

In some embodiments, and as shown in block 208, the process flow 200 may include the step of generating, in an instance where the at least one file is not a tape file type, a non-backup file attribute for the at least one file. By way of non-limiting example, the backup file attribution system may generate a non-backup file attribute (e.g., indicating the file is not a backup file) for any files that are not a tape file type (and/or where the files may be a WORM file type, a disk file type, and/or the like). For instance, the backup file attribution system may generate an initial non-backup file attribute for each of the files that do not have a backup file attribute initially generated for them based on the tape file type (e.g., as described above with respect to block 206) and/or non-tape file type (e.g., as described herein with respect to block 208).

In some embodiments, and as shown in block 210, the process flow 200 may include the step of generating, in an instance where the at least one file is not a tape file type and the at least one file comprises a backup feature in the data of the at least one file, a backup file attribute for the at least one file. In this manner, the backup file attribute system may manage the backup file attribution for each file based on the individual identification of the backup feature within each file. In some embodiments, the backup file attribution system may determine or confirm, in response to generating the backup file attribute for the at least one file comprising the tape file type, the at least one backup file attribute of the at least one file based on a determination that the at least one file comprising the tape file type comprises a backup feature in the data of the at least one file.

In some embodiments, the backup feature may be determined based on how many copies of the file are present within the open network system and/or closed network system. For instance, the backup file attribution system may determine that a file is copied in at least one other place within a network (e.g., open network system and/or closed network system), and based on this knowledge, the backup file attribution system may determine the file is a backup and each of the copies of the file in the network are also backups or that any of the copies of the files besides the original file are backup files.

In some embodiments, the backup file attribution system may determine a file is a backup (e.g., comprises a backup feature) based on parsing the creation data (such as the JCL data of the file and/or the executable code of the file) of the file to determine whether a backup identifier is present. Thus, and in some embodiments, a backup identifier may comprise an identification which may be unique or non-unique to identify the file (e.g., where there are a plurality of backup file copies associated with a network, each backup file may comprise the same backup identifier or may comprise a unique backup identifier, which may further be used to identify the particular storage location of the backup file).

By way of non-limiting example and based on determining the backup feature in the data of the at least one file, the backup file attribution system may determine and/or generate the at least one backup file attribute for the at least one file. In this manner, and where the backup file attribution system has determined a backup feature in the file, the backup file attribution system may then generate the backup file attribute for the same file, whereby such a backup file attribute may then be stored within the file itself, stored within the data of the file (e.g., the metadata), copied into a report comprising each of the backup files within the network (e.g., the open network and/or closed network), and/or the like.

In some embodiments, and as shown in block 212, the process flow 200 may include the step of generating, in an instance where the at least one file is a tape file type and the at least one file comprises a non-backup feature in the data of the at least one file, a non-backup file attribute for the at least one file. For instance, the backup file attribution system may determine a non-backup feature is present in the executable code associated with creating the at least one file, such as the presence of a non-backup identifier within the executable code of the file.

In some embodiments, the non-backup feature and/or the non-backup identifier may be determined by the backup attribution system based on receiving at least one of the non-backup feature(s) and/or the non-backup identifier(s) from a user of the backup attribution system (e.g., a user associated with the file and/or a user associated with the computing system comprising the file), a manager of the at least one file (e.g., a manager associated with the file and its storage and/or a manager associated with the computing system comprising the file), and/or the backup attribution system itself. In this manner, the backup attribution system may receive an indication of a non-backup feature and/or a non-backup identifier which the backup attribution system may use to determine if a file should be a non-backup file. Thus, and based on this example, the backup attribution system may manage the non-backup file attributions by determining exceptions, whereby the file may be originally considered to be a backup file based on its tape file type. For instance, and whereby the at least one file comprises a backup file attribute from step 206 (e.g., based on the at least one file comprising a tape file type), the backup file attribution system may determine the at least one file is not a backup file when a non-backup feature and/or non-backup identifier is present in the data of the at least one file.

Additionally, and in some embodiments, the backup file attribution system may manage the non-backup file attributions of files through a management of selections. For instance, the backup attribution system may receive at least one selection from a user associated with the at least one file (e.g., a user associated with the file and/or a user associated with the computing system comprising the file), a manager of the at least one file (e.g., a manager associated with the file and its storage and/or a manager associated with the computing system comprising the file), and/or the backup attribution system itself. Thus, and in some embodiments, the backup file attribution system may first generate a backup file attribute for the files identified as tape file types, and then may—based on the selection received by the backup file attribution system—determine the at least one file is not a backup file due to a selection of the at least one file by a user, a manager, and/or the like.

In some embodiments, the backup file attribution system may determine the at least one non-backup file attribute for the at least one file comprising the non-tape file attribute by determining the presence of a non-backup feature in the data of the at least one file. In this manner, the backup attribution system may determine the files which are not determined to be tape file types are not backup files based on a confirmation that the at least one file comprises a non-backup feature and/or non-backup identifier in the data of the file.

FIG. 3 illustrates a process flow 300 for storing the file associated with the backup file attribution, applying an immutability feature, , and/or storing the backup file report, in accordance with an embodiment of the invention. In some embodiments, a system (e.g., similar to one or more of the systems described herein with respect to FIGS. 1A-1D) may perform one or more of the steps of process flow 300. For example, a backup file attribution system (e.g., the system 130 described herein with respect to FIG. 1A-1D) may perform the steps of process 300.

In some embodiments, and as shown in block 312, the process flow 300 may include the step of storing the at least one file comprising the backup file attribute in a central record database. By way of non-limiting example, the backup file attribution system may store the at least one file and any of the files likewise comprising a backup file attribute in a central record database. In this manner, the backup file attribution system may comprise a central database which further comprises and/or tracks each of the files associated with a backup file attribute (e.g., each of the files within the network that are determined to be a backup file based on the backup file attribute generated at blocks 206 or 210).

In some embodiments, the central record database may be queried and/or interrogated to determine the data and files stored therein. In this manner, the backup file attribution system may comprise a one-step querying method for a user of the backup file attribution system, a manager of the backup file attribution system, and/or the backup file attribution system itself to determine all of the backup files within the network (e.g., the open network system and/or the closed network system). Thus, and in some embodiments, such a central record database comprising all the files and associated data for each of the backup files within the network allows the backup file attribution system to improve over prior systems in accurately tracking and storing backup files and associated, efficiently tracking and storing backup files and associated data, and allowing a uniform tracking and storage system of backup files without requiring a uniform compatibility for each of the files in order to make such a backup file determination.

Although not shown in FIG. 3, the process step described in block 312 may occur before and/or after each of the process steps described in blocks 316, 318, and/or 320. In this manner, the storage of the at least one file comprising the backup file attribute may occur before and/or after generating a backup file report, may occur before and/or after storing the backup file report in a central record database, may occur before and/or after storing the backup file attribute in a metadata of the at least one file, and/or the like.

In some embodiments, and as shown in block 314, the process flow 300 may include the step of applying an immutability feature to the at least one file comprising the tape file type. By way of non-limiting example, the backup file attribution system may apply an immutability feature to each of the files comprising the tape file type (e.g., such as the files described in blocks 206 and 212), such that the files and the associated data of each file cannot be changed, modified, renamed, deleted, and/or the like. Thus, and by way of non-limiting example, the backup file attribution backup file attribution system may ensure that each determined tape file will remain despite a malware attack and/or other data loss of the original and/or other copies.

In some embodiments, the backup file attribution system may apply an immutability feature to each of the files which comprise a backup file attribute (e.g., such as the files described above with respect to blocks 206 and 210) and/or each of the files which comprise the non-backup file attribute (e.g., such as the files described above with respect to blocks 208 and 212). In some embodiments, the backup file attribution system may apply an immutability feature to each of the files which comprise the tape file type (e.g., such as the files described above with respect to blocks 206 and 212) and the file which are not tape file types (e.g., such as the files described above with respect to blocks 208 and 210).

Although not shown in FIG. 3, the process step described in block 314 may occur before and/or after each of the process steps described in blocks 312, 316, 318, and/or 320. In this manner, the application of the immutability feature to the at least one file comprising the backup file attribute may occur before and/or after the storage of the at least one file comprising the backup file attribute, may occur before and/or after generating a backup file report, may occur before and/or after storing the backup file report in a central record database, may occur before and/or after storing the backup file attribute in a metadata of the at least one file, and/or the like.

In some embodiments, and as shown in block 316, the process flow 300 may include the step of generating a backup file report comprising a file identifier for each file of the at least one file comprising the backup file attribute. By way of non-limiting example, the backup file attribution system may generate a backup file report comprising a file identifier for each file that the backup file attribution system has generated a backup file attribute (e.g., as discussed in the steps for blocks 206 and/or 210). In some embodiments, the backup file attribution system may generate a backup file report comprising a file identifier, where each file identifier may be unique and/or non-unique. For instance, and where there are multiple copies of the same backup file within the network, the backup file attribution system may generate a non-unique file identifier, such that each file identifier is the same for each backup copy of the file. In some embodiments, and for instance, the backup file attribution system may generate a unique file identifier for each backup file in the network, such that each file identifier additionally identifies the storage location of each backup file and other such unique or identifying data (e.g., a file creation timestamp of the backup file, and/or the like). Thus, and in some embodiments, the backup file attribution system—upon generating and/or determining the file identifier for each backup file—may generate a backup file report comprising all the file identifiers for all the backup files in the network. Such a backup file report may indicate the total number of backup files in the network, the storage locations of each backup file, the number of copies of each backup file, the names of each backup file, and/or the like. Thus, and in some embodiments, the backup file report may be used by a user of the backup file attribution system, by a manager of the backup file attribution system, by the backup file attribution system itself, and/or the like to identify and track each backup file and their associated data within the network.

Although not shown in FIG. 3, the process step described in block 316 may occur before and/or after each of the process steps described in blocks 312, and/or 320. In this manner, the generation of the backup file report comprising a file identifier for each of the files of the at least one file comprising the backup file attribute may occur before and/or after the storage of the at least one file comprising the backup file attribute, may occur before and/or after storing the backup file attribute in a metadata of the at least one file, and/or the like.

In some embodiments, and as shown in block 318, the process flow 300 may include the step of storing the backup file report in a central record database. By way of non-limiting example, the backup file attribution system may store the backup file report in the central record database (e.g., such as the central record database described in block 312). In this manner, the backup file attribution system may identify and track each of the backup files (and associated file identifiers) in the same database which comprises the backup files and associated data. Thus, the backup file attribution system may store each of the backup files and the associated backup file report comprising the file identifier of each of the backup files in a central record database for accurate and efficient call-up of each backup file, as the need occurs. Such a callup may occur based on a query submitted by a user of the backup file attribution system, a manager of the backup file attribution system, the backup file attribution system itself, and/or the like.

Although not shown in FIG. 3, the process step described in block 318 may additionally occur before and/or after each of the process steps described in blocks 312, and/or 320. In this manner, the storage of the backup file report in the central record database may occur before and/or after the storage of the at least one file comprising the backup file attribute, may occur before and/or after storing the backup file attribute in a metadata of the at least one file, and/or the like.

In some embodiments, and as shown in block 320, the process flow 300 may include the step of storing the backup file attribute in a metadata of the at least one file. By way of non-limiting example, the backup file attribution system may store the backup file attribute in the metadata of the file that is associated with the backup file attribute (e.g., such as the generation of the backup file attribute like that described in blocks 206 and/or 210). Thus, and in some embodiments, the backup file attribution system may store the backup file attribute in the metadata of the associated file, such that the backup file attribute is part of the data of the file. In this manner, and in some embodiments, the metadata of each file may be parsed to quickly determined and/or verify the file is in fact a backup file.

Although not shown in FIG. 3, the process step described in block 320 may occur before each of the process steps described in blocks 312, 316, and/or 318. In this manner, the storage of the backup file attribute in the metadata of the at least one file comprising a backup file attribute (e.g., as described in blocks 206 and/or 210) may occur before and/or after the storage of the at least one file comprising the backup file attribute, may occur before and/or after the generation of the backup file report comprising the file identifier(s), may occur before and/or after the storage of the backup file report in the central record database, and/or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for determining and applying a backup file attribution to files, the system comprising:
   a memory device with computer-readable program code stored thereon;
   at least one processing device operatively coupled to the at least one memory device and at least one communication device, wherein executing the computer-readable program code is configured to cause the at least one processing device to:
   receive data associated with a plurality of files, wherein the plurality of files are stored in at least one data store and wherein the data comprises a file type;
   determine, by the at least one processing device, each file type for at least one file in the plurality of files is a write-once file or a non-write-once file;
   generate, at a first instance, a backup file attribute for each file comprising the file type of the write-once file;
   identify, at a second instance, each file comprising the non-write-once file as the file type;
   identify, at a third instance and based on each file comprising the non-write-once file as the file type, a backup feature in at least one file from each file comprising the non-write-once file type;
   generate, for the at least one file comprising the backup feature, the backup file attribute or the at least one file;
   generate a non-backup file attribute for each file from the plurality of files that is not a tape file type, comprises the non-write-once file, and does not comprise the backup feature, and wherein the non-backup feature comprises a non-backup identifier in executable code associated with creating the each file;
   apply an immutability feature to the at least one file comprising the tape file type;
   store, by the at least one processing device, the backup file attribute in the metadata of each file comprising the write-once file and the backup feature; and
   store, by the at least one processing device, each file comprising the backup file attribute in a central record database.

2. The system of claim 1, wherein the at least one file comprises one of a write-once read many (WORM) file type or a disk file type.

3. The system of claim 1, wherein the central record database is stored in a computing system.

4. The system of claim 1, wherein the processing device is further configured to generate a backup file report comprising a file identifier for each file of the plurality of files comprising the backup file attribute.

5. The system of claim 4, wherein the processing device is further configured to store the backup file report in a central record database.

6. A computer program product for determining and applying a backup file attribution to files, wherein the computer program product comprises at least one non-transitory computer-readable medium having computer-readable program code portions embodied therein, the computer-readable program code portions which when executed by a processing device are configured to cause a processor to:
   receive data associated with a plurality of files, wherein the plurality of files are stored in at least one data store and wherein the data comprises a file type;
   determine, by the at least one processing device, each file type for at least one file in the plurality of files is a write-once file or a non-write-once file;
   generate, at a first instance, a backup file attribute for each file comprising the file type of the write-once file;
   identify, at a second instance, each file comprising the non-write-once file as the file type;
   identify, at a third instance and based on each file comprising the non-write-once file as the file type, a backup feature in at least one file from each file comprising the non-write-once file type;
   generate, for the at least one file comprising the backup feature, the backup file attribute or the at least one file;
   generate a non-backup file attribute for each file from the plurality of files that is not a tape file type, comprises the non-write-once file, and does not comprise the backup feature, and wherein the non-backup feature comprises a non-backup identifier in executable code associated with creating the each file;
   apply an immutability feature to the at least one file comprising the tape file type;
   store, by the at least one processing device, the backup file attribute in the metadata of each file comprising the write-once file and the backup feature; and
   store, by the at least one processing device, each file comprising the backup file attribute in a central record database.

7. The computer program product of claim 6, wherein the processing device is configured to cause the processor to store the central record database in a computing system.

8. The computer program product of claim 6, wherein the processing device is further configured to cause the processor to generate a backup file report comprising a file identifier for each file of the plurality of files comprising the backup file attribute.

9. The computer program product of claim 6, wherein the processing device is configured to cause the processor to apply an immutability feature to the at least one file comprising tape file type.

10. A computer-implemented method for determining and applying a backup file attribution to files, the computer-implemented method comprising:
    receiving data associated with a plurality of files, wherein the plurality of files are stored in at least one data store and wherein the data comprises a file type;
    determining, by the at least one processing device, each file type for at least one file in the plurality of files is a write-once file or a non-write-once file;
    generating, at a first instance, a backup file attribute for each file comprising the file type of the write-once file;
    identifying, at a second instance, each file comprising the non-write-once file as the file type;
    identifying, at a third instance and based on each file comprising the non-write-once file as the file type, a backup feature in at least one file from each file comprising the non-write-once file type;
    generating, for the at least one file comprising the backup feature, the backup file attribute or the at least one file;
    generating a non-backup file attribute for each file from the plurality of files that is not a tape file type, comprises the non-write-once file, and does not comprise the backup feature, and wherein the non-backup feature comprises a non-backup identifier in executable code associated with creating the each file;

applying an immutability feature to the at least one file comprising the tape file type;

storing, by the at least one processing device, the backup file attribute in the metadata of each file comprising the write-once file and the backup feature; and storing, by the at least one processing device, each file comprising the backup file attribute in a central record database.

11. The computer-implemented method of claim 10, wherein the central record database is stored in a computing system.

12. The computer-implemented method of claim 10, further comprising generating a backup file report comprising a file identifier for each file of the plurality of files comprising the tape file type.

* * * * *